Patented Nov. 21, 1944

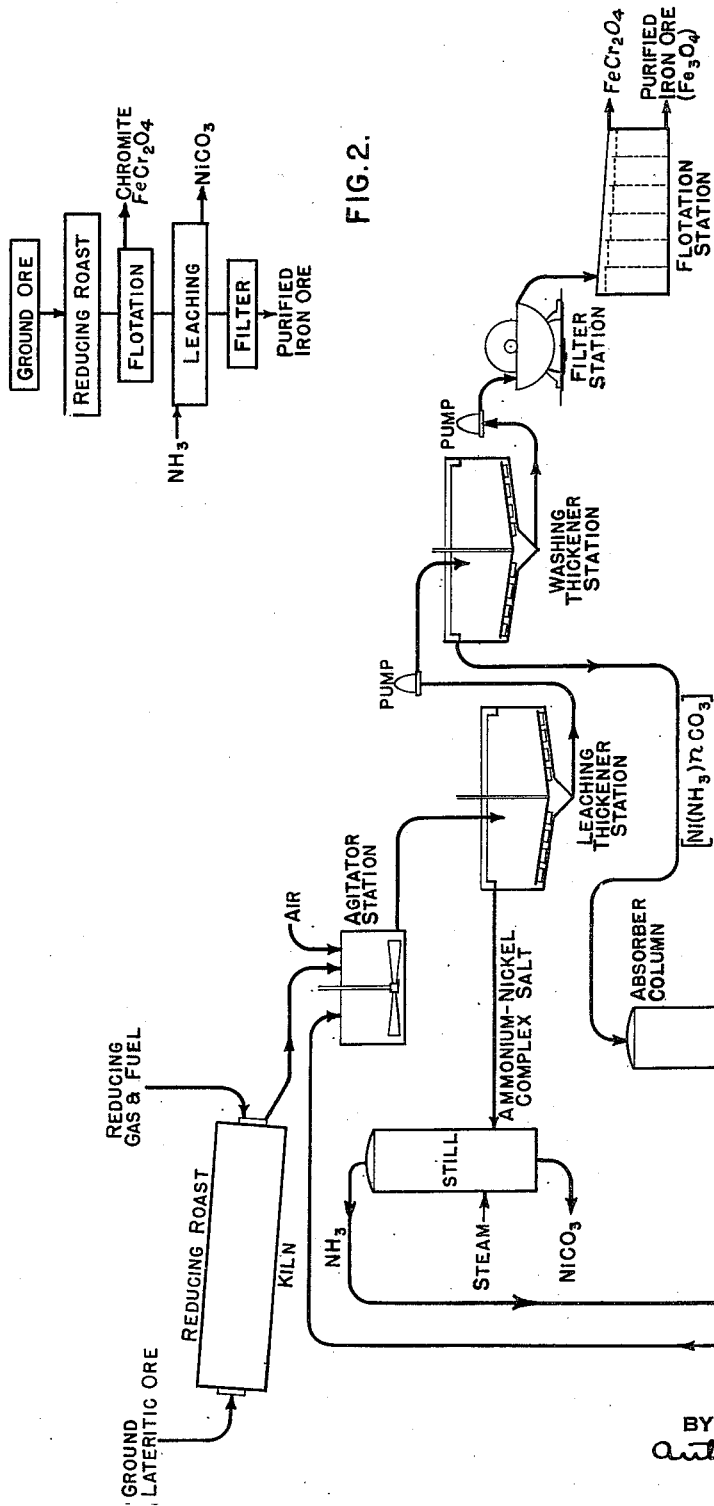

2,363,315

UNITED STATES PATENT OFFICE

2,363,315

TREATING LATERITIC ORES

John D. Grothe, Weston, Conn., assignor to The Dorr Company, New York, N. Y., a corporation of Delaware Application May 16, 1942, Serial No. 443,323

2 Claims. (Cl. 75—21)

This invention relates to the treatment of ferruginous ores that have as constituents thereof, compounds of certain non-ferrous metals particularly such as nickel and chromium that are to be removed from the ferruginous constituents of the ore before such ores can be used efficiently in steel making. Such an ore is sometimes termed lateritic ore and an example thereof is the Mayori ore of Cuba.

Such an ore is usually characterized by the presence therein of nickel within an approximate range of from .5 to 1.5% and of chromium within an approximate range of from 1.5 to 4.0%. The ore may have other oxidic constituents such as the oxides of cobalt, manganese, copper, silicon and aluminum, but on the whole the main problem is to recover the nickel values and to condition the remaining constituents so that there can be accomplished a ready separation of the ferruginous constituents from the non-steel making constituents and especially from the oxide of chromium which is known as chromite ($FeCr_2O_4$).

An object of this invention, therefore, is to remove the nickel from the ore in a manner whereby the recovered nickel is in a form that is saleable of itself in order to defray at least a part of the cost of purifying the iron ore. Another object of the invention is to treat or condition the ore so that a substantial quantity of its chromium content can be removed.

The ferruginous constituents of such an ore are mainly in the form of limonite ($Fe_2O_3.H_2O$) which is a naturally slimy and finely divided substance that is in effect a yellow pigment. This material tends to be adsorbed on or to encase the chromite grains so that it is difficult to separate one of these materials from the other, and especially by gravimetric methods, so it is another object of this invention to convert the limonite into magnetite ($Fe_3O_4$) which is a heavier and crystalline material that is readily separable from the chromite and other non-ferruginous constituents of the ore.

The invention may be said to revolve about the following steps: subjecting the finely ground ore to a reducing roast for converting limonite to magnetite; removing chromite as by flotation; leaching nickel values from the ore under chemically reactive conditions whereby the nickel is recovered as basic nickel carbonate which is a marketable commodity; and recovering magnetite by gravimetric methods. This sequence is not essential insofar as the leaching out of the nickel values can precede the removal of the chromite, if desired.

The ore is to be subjected to the reducing roast under conditions whereby the nickel silicates of the ore are broken up and reduced to metallic nickel. During the roast the iron oxide (limonite) first loses combined water, is turned to hematite ($Fe_2O_3$) and then converted to magnetite but under conditions whereby a minimum of metallic iron is produced by the roast. The temperature at which the roast is carried out seems to control the production of metallic iron, in that if the roast is carried out at a temperature below 600° C. there is yielded ferruginous material, mostly as Fe, since FeO is not found. If the roast be carried out at a temperature of about 900° C., the ferruginous material is found to be mostly as $Fe_3O_4$ and practically no Fe. Therefore, it seems safe to say that the roast should be carried out at a temperature of the order of 900° C. and higher rather than much lower.

The leaching out of the nickel values from the ore is accomplished by subjecting the ore that has been roasted under reducing conditions, to the action of a leaching or lixiviating solution provided by a suitable ammoniacal ammonium salt, specifically an ammoniacal solution of ammonium carbonate. The leaching and the concomitant chemical reaction between the ammonia compound and the non-metallic nickel yields a liquor of complex nickel ammonium carbonate salts, and suspended solids of the metallic oxides of other than nickel, residually present in the pulp. The leaching must take place in the presence of an excess of oxygen, which may be derived from a source such as air or preferably carbon dioxide gas, if the lower oxides of nickel present are to be efficiently converted to the nickel-ammonium complex.

The chromite present in the ore is very finely divided, but the limonite of the ore is even more finely divided, and that makes it difficult to separate these two constituents. But when the limonite is converted to magnetite by the deliberately carried-out roasting step to this end, the problem of subsequent separation is much simplified because the specific gravity of magnetite is 5.1 whereas the specific gravity of the chromite is 4.4. The specific gravity of limonite is only 3.8. Thus, the heavier and crystalline magnetite can be separated readily from the more finely divided and lighter chromite. This separation can be accomplished when these constituents are in suspension, by subjecting them to flotation or to sedimentation in a thickener or in a hydroseparator, with the result that the chromite passes out by one path as effluent whereas the magnetite passes out by another path as underflow. This separation of chromite from magnetite can be practiced between the reducing roast and the nickel leaching station or after the nickel leaching has taken place.

Thus, this invention teaches specifically how to treat a lateritic ore, namely an ore that is unusable for steel-making purposes because of its chromium and nickel content, to recover the nickel values thereof in the form of a marketable commodity, and to remove the chromite so that the residual end product comprises an oxide of iron that is uncontaminated with constituents harmful in steel making; with income from the sale of the nickel values offsetting at least a part of the cost of preparing the ore for use in steel making.

The invention is illustrated, as best it can be, in the accompanying drawings in which Figure 1 is a flowsheet or chart, with the equipment used, shown diagrammatically. Figure 2 is a flowsheet or chart for indicating the sequence of the leaching and flotation stations to be reversed over those shown in Figure 1.

Referring to Figure 1, the ore which has been ground to a fineness of the order of minus 35 screen mesh, or as fine as may be necessary to obtain best results (which may be as fine as minus 200 mesh), is fed to a station, such as a rotary kiln, wherein the ore is subjected to a reducing roast at a temperature of the order of 900° C. for one hour or long enough to convert substantially all of the limonite of the ore to magnetite, while producing a minimum of metallic iron. What seems to happen is that the limonite is first rid of its water of hydration, to yield hematite and then reduced to magnetite. The roast is also carried out long enough at the temperatures stated, to break down the nickel silicates of the garnierite of the ore and reduce them to produce a lower oxide of nickel or to metallic nickel. The roast is carried out as far as possible in the absence of air, and air is kept away from the roasted material during its transfer from the place of roasting to the next subsequent treatment station in order that the nickel will not be re-oxidized during the cooling period.

More particularly, the roasted material or mass is supplied to an agitator station wherein the primary agitators at least are closed whereby oxygen added thereto may be controlled. The agitator station may contain as many agitators in series as good leaching practice calls for. In the agitator station, the roasted mass is put into suspension in a liquid-containing ammonia or some compound thereof, and an excess of air. The purpose of the leaching is to lixiviate from the suspension the nickel values and to convert them into the form of a liquid phase nickel-ammonium complex salt $(Ni(NH_3)nCO_3)$. The leaching seems to be mainly effective in about the proportion as nickel oxide is present rather than metallic nickel, for apparently metallic nickel is not soluble in the lixiviant used. In order to assure a maximum amount of oxide present, the roasted mass when treated in the agitation station with the lixiviant, must also have a controlled amount of an oxygen-bearing gas present. The pulp discharged from the agitator station consists of liquor in which the nickel ammonium complex is dissolved and suspended solids that comprise chromite, magnetite and other residual oxides such as those of aluminum, magnesium, and silicon.

The pulp from the agitator station is then fed to a leaching station that is in effect a plurality of leaching thickeners of the continuous, mechanically cleaned, decanting type. From this leaching thickener station there is released thickener underflow pulp by one path, and effluent liquid by another path. The effluent comprises the ammonia leaching agent with its burden of dissolved ammonia nickel complex salt which is conducted to an absorbing column and then to a still, or still station, wherein the nickel ammonium complex salt is broken down by heat into nickel carbonate and ammonia gas, from whence nickel carbonate is removed by one path whereas ammonia gas is removed by another path to be possibly reused as lixiviant in the agitator station after re-absorption, condensing, etc. More particularly, effluent from the washing thickener station comprising essentially

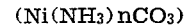

$(Ni(NH_3)nCO_3)$ is passed to an absorption column to which is added, for the purpose of making up plant losses, ammonia gas and carbon dioxide gas. From the absorption column there is conducted ammonia gas by one path leading to the still station, while by another path is conducted to the agitator station liquor that comprises substantially

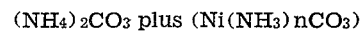

$(NH_4)_2CO_3$ plus $(Ni(NH_3)nCO_3)$

Steam is supplied to the still as well as the ammonium nickel complex as effluent from the leaching thickener station, and from the still issues nickel carbonate as a marketable commodity.

Underflow from the leaching thickener station is pumped as pulp to a washing thickener station made up of one or more thickeners of the continuous, mechanically cleaned, decanting type. From this washing thickener station, effluent liquid is released by one path and underflow pulp by another. The effluent liquid which contains generally ammonium carbonate and nickel ammonium complex is recycled to the agitator station to be used as additive lixiviant. The underflow pulp is then conducted to a filter station where the pulp is dewatered, and then the filter cake, after being returned to suspension, is subjected to treatment in a flotation (or other gravimetric separation apparatus) to remove the chromite as "float," or as gravity product and to discharge as concentrates, the magnetite and other constituents of the purified iron ore—none of which are harmful if the ore is used in steel making.

Figure 2 is used to show that in the flowsheet of Figure 1 the flotation station can precede the leaching station so that the flotation station comes immediately after the reducing roast station or kiln. In the sequence, the chromite is removed before the pulp is subjected to the ammonia leaching.

I claim:

1. The process of treating lateritic oxidic iron ore having a natural content of nickel values and chromite to recover selectively in purified form its ferruginous constituents, which comprises subjecting such constituents by reducing heat treatment carried out for substantially not less than one hour at substantially not less than 900° C. for converting them from slimy compounds lighter than the chromite into iron compounds that are granular and heavier than chromite while minimizing the production of metallic iron, establishing a suspension of the resulting mass in water, and subjecting such suspension to two treatment steps of which one is leaching nickel values from such suspension and the other is classifying particles of the lighter chromite and of such heavier iron compound for selectively separating them.

2. The process of treating ground lateritic oxidic iron ore having a natural content of nickel oxide values and chromite to recover selectively in purified form its nickel values and its ferruginous constituents which are present in the ore mainly in finely divided and slimy form, which comprises subjecting such ore to a reducing roast under conditions that minimize the production of metallic iron and of nickel while reducing nickel oxides to lower oxides of nickel and that convert such slimy ferruginous constituents that are lighter than the chromite into iron compounds that are granular and heavier than the chromite, mixing the roasted mass with water to get its solids into suspension, subjecting the suspension to two steps of which one is to recover the nickel values and the other is to remove chromite, the nickel recovery step comprising that of subjecting the suspension to leaching in the presence of excess oxygen by an ammoniacal solution of ammonium carbonate followed by distilling ammonia vapors from the residual nickel carbonate while the chromite rejection step comprises that of subjecting the suspension to a classifying separation from which purified ferruginous constituents are recovered while chromite is removed therefrom.

JOHN D. GROTHE.